(12) United States Patent
Harms

(10) Patent No.: US 12,241,211 B2
(45) Date of Patent: Mar. 4, 2025

(54) METHOD AND APPARATUS FOR DETECTING A DATA SET

(71) Applicant: MOBA Mobile Automation AG, Limburg (DE)

(72) Inventor: Volker Harms, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 663 days.

(21) Appl. No.: 17/354,800

(22) Filed: Jun. 22, 2021

(65) Prior Publication Data

US 2021/0395961 A1 Dec. 23, 2021

(30) Foreign Application Priority Data

Jun. 22, 2020 (EP) .................................... 20181434

(51) Int. Cl.
| | | |
|---|---|---|
| *E01C 23/07* | (2006.01) | |
| *G01K 13/10* | (2006.01) | |
| *G06F 18/214* | (2023.01) | |
| *G06N 20/00* | (2019.01) | |

(52) U.S. Cl.
CPC .............. *E01C 23/07* (2013.01); *G01K 13/10* (2013.01); *G06F 18/214* (2023.01); *G06N 20/00* (2019.01)

(58) Field of Classification Search
CPC ....... E01C 19/02; G01K 13/10; G06F 18/214; G06N 20/00
USPC .................................................... 404/72–118
See application file for complete search history.

(56) References Cited

U.S. PATENT DOCUMENTS

| | | | | |
|---|---|---|---|---|
| 9,963,836 | B1 * | 5/2018 | Brenner | G01B 17/06 |
| 10,662,595 | B2 * | 5/2020 | Buschmann | E01C 19/48 |
| 2009/0142133 | A1 | 6/2009 | Glee et al. | |
| 2012/0321386 | A1 * | 12/2012 | Hanfland | E01C 19/48 404/118 |
| 2014/0086684 | A1 * | 3/2014 | Sehr | G01J 5/0846 73/290 V |

(Continued)

FOREIGN PATENT DOCUMENTS

| | | |
|---|---|---|
| CN | 102691251 A | 9/2012 |
| CN | 105333959 A | 2/2016 |

(Continued)

*Primary Examiner* — Raymond W Addie
(74) *Attorney, Agent, or Firm* — PERKINS COIE LLP; Michael A. Glenn

(57) ABSTRACT

Method for detecting a quality of paving material distributed along a paving area using a paver, including: receiving a first thermal profile of a portion of the paving area where the paving material is distributed, the first thermal profile having a plurality of temperature values assigned to respective measurement points; the portion including a first subportion; analyzing the first thermal profile to detect segregated spots of paving material within the portion enabling to determine a quality of the paving material, including: determining a first zone of the measuring points arranged adjacent to each other and having temperature values within a predetermined range, the first zone corresponding to the first subportion and being at least partially surrounded by measurement points having temperature values out of the predetermined range; determining a first analysis parameter for the first zone; and determining a first quality parameter for the subportion to assign the first quality parameter to the first analysis parameter.

22 Claims, 12 Drawing Sheets

(56) References Cited

U.S. PATENT DOCUMENTS

| | | | |
|---|---|---|---|
| 2014/0308074 A1 | 10/2014 | Rutz et al. | |
| 2015/0030392 A1* | 1/2015 | Commuri | E01C 19/23 404/75 |
| 2016/0042235 A1* | 2/2016 | Buschmann | G01J 5/0859 348/148 |
| 2016/0060819 A1* | 3/2016 | Oetken | E01C 19/23 404/72 |
| 2016/0061755 A1 | 3/2016 | Delius et al. | |
| 2017/0292233 A1* | 10/2017 | Watermann | G08B 21/182 |
| 2019/0106846 A1* | 4/2019 | Marsolek | G08G 1/096708 |
| 2021/0301480 A1 | 9/2021 | Shelstad et al. | |

FOREIGN PATENT DOCUMENTS

| | | |
|---|---|---|
| CN | 109487665 A | 3/2019 |
| DE | 102008058481 A1 | 7/2009 |
| EP | 2666908 A1 | 11/2013 |
| EP | 2789741 A1 | 10/2014 |
| EP | 2982951 A1 | 2/2016 |
| EP | 2990531 A1 | 3/2016 |
| EP | 3456880 A1 | 3/2019 |
| WO | 0070150 A1 | 11/2000 |

* cited by examiner

METHOD AND APPARATUS FOR DETECTING A DATA SET

CROSS-REFERENCE TO RELATED APPLICATION

This application claims priority from European Patent Application No. 20 181 434.0, which was filed on Jun. 22, 2020, and is incorporated herein in its entirety by reference.

Embodiments of the present invention refer to a method for detecting a data set comprising at least a first quality parameter and a first analysis parameter and enabling to evaluate a quality of a paving material.

A further embodiment refers to a corresponding apparatus. Further embodiments refer to a paver comprising such an apparatus. The global aim of the embodiments is to improve a quality control system in the field of road construction machines, for example, asphalt paving machines, based on temperature measurements of the newly laid materials such as asphalt or bitumen, right behind the machine or the tool (screed).

BACKGROUND OF THE INVENTION

Quality control in the field of asphalt laying is of great importance. The processing temperature of the new laid material is an important process variable in road construction which substantially influences the usage properties, such as stability, layer adhesion and service life of the laid pavements. Asphalt paving machines (pavers) typically distribute the paving material and carry out pre-compacting of a surface of the paving material with a screed, which is attached to the rear end of the paver and is drawn thereby. The laid pavement is subsequently compacted still further by rollers. Like other factors, such as environmental and weather conditions during laying, the temperature of the material in different stages of the laying process influences the efficiency and the success of a paving job.

Processing the material under optimum temperature conditions has long been recognized as important, but such processing often entails manual control measurements on the part of the support and operating staff. Paving material is typically obtained at a comparatively high temperature at an asphalt or bitumen plant. Depending on the distance a supply machine has to travel so as to reach a work site as well as on the traffic and the ambient temperature, the asphalt may cool to a certain extent prior to delivery. In addition, progress of the paving machines and of the compacting machines or rollers may vary.

The extent of cooling, once the paving material has finally reached the paving machine or paver, may vary depending on the temperature of the paving material at delivery, environmental factors, etc. In some cases, paving material may segregate within the paving machine, and thus relatively cooler and relatively hotter pockets or accumulations of material within the machine may exist, leading to unexpected, mostly punctual, temperature gradients in the paving material once the latter is distributed on the work surface. In a typical laying process, the paving material is discharged, distributed by the paving machine or paver, and subsequently pre-compacted by means of the screed, and is then ready to be compacted still further by the various compacting machines. In the course of this process, the material temperature can deviate significantly from an expected temperature. In addition, the material temperature may be non-uniform from one paved region to the next due to changing weather conditions or due to unintended segregation or poor mixing.

Due to the importance of the laying temperature of the pavement in the laying process, measuring of the laying temperature becomes increasingly important. Known systems measure for this purpose the laying temperature behind the paver, in particular behind the screed. A plurality of conventional approaches are present which are based on thermography.

The EP 2 789 741 A1 describes a road finishing machine with a thermographic device, fixed to a portion of the machine for recording a georeferenced thermographic data record of at least one region of a pavement layer. The road finishing machine comprises a display on which all measuring results of the thermographic device may be indicated and which offers the possibility of suggesting improved paving parameters to the operator, based on the measuring results of the thermographic device.

The EP 2 982 951 A1 describes a thermography module for road finishers, with a temperature measuring device, imaging means and an evaluation unit. The evaluation unit is configured to determine a deviation area if, based on sensed temperature values, one or more deviation criteria are met.

The CN 102691251 A describes a paver asphalt temperature segregation infrared detection system and a detection method. The system provides real-time monitoring of the measured temperature during asphalt paving. Adverse factors generated during asphalt paving can be obtained with the monitoring results, and a solution scheme can be formed at a first time. The adverse factors can be controlled, and their effects can be reduced or completely eliminated, which ensures the paving quality.

The WO 00/70150 A1 describes a pavement temperature monitoring system with a temperature sensor mounted on a rear end of a paver vehicle in such a way that the entire width of the formed mat can be scanned or imaged. A display device is capable of receiving a plurality of electrical signals from the temperature sensor and generating and displaying a graphical image of the formed mat temperature profile.

The DE 10 2008 058 481 A1 describes an asphalt system wherein the navigation of construction vehicles is based on a so-called position temperature model. The system determines where to best employ compacting vehicles on the basis of the initially assessed and then measured asphalt temperature.

Furthermore, EP 2 990 531 A1 and EP 2 666 908 A1 describe systems and methods for road finishers for determining a cooling behavior of a new paved asphalt mat.

Some of the known conventional documents describe to give the machine operator suggestions to improve machine parameters in case the measured temperature of the new laid paving material is below or above a predetermined temperature. But it is not really said that these suggestions given to the machine operator are always right because none of the aforementioned known documents deal with the exact root cause of such temperature deviations or analyze the real and true symptoms for the thermal segregation of the paving material which occur during the paving process. It depends mainly on the experience of the machine operator or the paving crew to change the right parameters of the machine to ensure that the paving material will be laid by a paver under optimum conditions.

Another conventional document is EP 3 456 880 A1 describing an approach for controlling the quality of a paving material. Here, a thermal profile or a thermal pattern is identified and analyzed, e.g., based on the orientation of the thermal pattern in order to draw conclusions from this thermal pattern. However, there are a plurality of different patterns enabling such a conclusion, wherein according to conventional technology, just a limited number of error types are known. Therefore there is a need for an improved approach.

SUMMARY

According to an embodiment, a method for detecting a quality of a paving material distributed along a paving area using a paver may have the steps of: receiving a first thermal profile of a portion of the paving area in which the paving material is distributed, the first thermal profile includes a plurality of temperature values assigned to respective measurement points; wherein the portion includes a first subportion; analyzing the first thermal profile in order to detect segregated spots of the paving material within the portion enabling to determine a quality of the paving material, the analyzing having the steps of: determining a first zone of the measuring points arranged adjacent to each other and with temperature values within a predetermined range, wherein the first zone corresponds to the first subportion and wherein the first zone is at least partially surrounded by measurement points with temperature values out of the predetermined range; determining a first analysis parameter for the first zone; and determining a first quality parameter for the subportion so as to assign the first quality parameter to the first analysis parameter, wherein the first analysis parameter enables a conclusion regarding the quality of the pavement; wherein the analyzing is based on learning data including at least a learning parameter and at least input data, wherein the input data includes the first analysis parameter or a pattern as the first analysis parameter and wherein the learning parameter includes the first quality parameter or an error type of the paving material at the first subportion as the first quality parameter.

Another embodiment may have a non-transitory digital storage medium having a computer program stored thereon to perform the method for detecting a quality of a paving material distributed along a paving area using a paver, the method having the steps of: receiving a first thermal profile of a portion of the paving area in which the paving material is distributed, the first thermal profile includes a plurality of temperature values assigned to respective measurement points; wherein the portion includes a first subportion; analyzing the first thermal profile in order to detect segregated spots of the paving material within the portion enabling to determine a quality of the paving material, the analyzing having the steps of: determining a first zone of the measuring points arranged adjacent to each other and with temperature values within a predetermined range, wherein the first zone corresponds to the first subportion and wherein the first zone is at least partially surrounded by measurement points with temperature values out of the predetermined range; determining a first analysis parameter for the first zone; and determining a first quality parameter for the subportion so as to assign the first quality parameter to the first analysis parameter, wherein the first analysis parameter enables a conclusion regarding the quality of the pavement; wherein the analyzing is based on learning data including at least a learning parameter and at least input data, wherein the input data includes the first analysis parameter or a pattern as the first analysis parameter and wherein the learning parameter includes the first quality parameter or an error type of the paving material at the first subportion as the first quality parameter, when said computer program is run by a computer.

According to another embodiment, an apparatus for detecting the quality of a paving material distributed along a paving area may have: an interface for receiving a first thermal profile of a portion of the paving area in which the paving material is distributed, that the first thermal profile includes a plurality of temperature values assigned to respective measurement points; wherein the portion includes a first subportion; and a calculation unit for analyzing the first thermal profile in order to detect segregated spots of the paving material within the portion enabling to determine a quality of the paving material, the analyzing having the steps of: determining a first zone of the measuring points arranged adjacent to each other and with temperature values within a predetermined range, wherein the first zone corresponds to the first subportion and wherein the first zone is at least partially surrounded by measurement points with temperature values out of the predetermined range; determining a first analysis parameter for the first zone; and determining a first quality parameter for the subportion so as to assign the first quality parameter to the first analysis parameter; wherein the first analysis parameter enables a conclusion regarding the quality of the pavement; wherein the analyzing is based on learning data including at least a learning parameter and at least input data, wherein the input data includes the first analysis parameter or a pattern as the first analysis parameter and wherein the learning parameter includes the first quality parameter or an error type of the paving material at the first subportion as the first quality parameter.

Another embodiment may have a paver for distributing paving material including an inventive apparatus.

An embodiment provides a method for detecting a data set comprising at least a first quality parameter and a first analysis parameter and enabling to evaluate a quality of a paving material distributed along a paving area using a paver. The method comprises the basic steps of receiving a first thermal profile and analyzing the first thermal profile. The first thermal profile belongs to a portion of the paving area in which the paving material is distributed; the first thermal profile comprises a plurality of temperature values assigned to respective measurement points, wherein the portion comprises a first subportion. The analyzing the first thermal profile has the purpose to detect segregated spots of the paving material within the portion enabling to determine a quality of the paving material. The analyzing comprises:

determining a first zone of the measuring points arranged adjacent to each other and having temperature values within a predetermined range, wherein the first zone corresponds to the first subportion and wherein the first zone is at least partially surrounded by measurement points having temperature values out of the predetermined range;

determining a first analysis parameter for the first zone (e.g. orientation of the first zone with respect to a travel direction or an average temperature); and determining a first quality parameter for the subportion (e.g. parameter describing an error type of the paving material at the first subportion) so as to assign the first quality parameter to the first analysis parameter.

According to embodiments, the method comprises the step of storing the first analysis parameter together with the first quality parameter; alternatively the method comprises the step of transmitting the first analysis parameter together with the first quality parameter so as to store the first analysis parameter and the first quality parameter on a server.

According to embodiments, the step of analyzing comprising a self-learning algorithm and/or is based on artificial intelligence.

According to embodiments, the method comprises the step of selecting the analysis parameter or section of one or more possible analysis parameters before performing the step analyzing. The group of possible analysis parameters can comprise:
- orientation of the first zone with respect to a travel direction;
- an average temperature of the temperature values within the first zone;
- a relative temperature of the temperature values within the first zone when compared to the temperature values belonging to the measurement points surrounding the first zone;
- a size of the first zone;
- a temperature deviation within the first zone;
- a shape of a pattern of the first zone;
- a presence of a second zone of measurement points corresponding to a second subportion of the portion;
- a further zone of measurement points corresponding to a further subportion of the portion;
- a distance of the first zone to a second zone or to a further zone;
- a relative position of the first zone to a second zone or a further zone; or
- a combination of at least two or more group elements.

This preselection of analysis parameter helps to train the detection algorithm such that same performs an accurate and failure resistant quality analysis (diagnosis).

Embodiments of the present invention are based on the finding that within a temperature profile or thermal pattern one or more analysis parameter can be determined, like the shape of the pattern or a temperature deviation of a spot from the surrounding, and used together with a quality information, like information on an error type so as to determine a data set/learning data. These steps can be automatically or semi automatically performed, e.g., by use of artificial intelligence. The data set determined in the described manner enables to form a data basis by use of which the determination of different situations, e.g., different data types determined based on a thermal profile can be detected. As discussed above, the described method can be based on a self-learning algorithm, so same can be implemented using artificial intelligence. In doing so, it is beneficial to enhance the data set continuously and improve the accuracy, respectively. Another advantage is that the entire method or most parts of the method can be performed automatically. It is another advantage that the knowledge generated by the self-learning algorithms can be shared with other systems and/or transferred to other paving systems/control systems of pavers.

According to embodiments, the step of determining the first zone of the measuring points comprises a step of pattern determination. The pattern can be described by use of the analysis parameter. In general, the analysis parameter can be (selected) out of the group comprising:
- orientation of the first zone with respect to a travel direction;
- an average temperature of the temperature values within the first zone;
- a relative temperature of the temperature values within the first zone when compared to the temperature values belonging to the measurement points surrounding the first zone;
- a size of the first zone;
- a temperature deviation within the first zone;
- a shape of a pattern of the first zone;
- a presence of a second zone of measurement points corresponding to a second subportion of the portion;
- a further zone of measurement points corresponding to a further subportion of the portion;
- a distance of the first zone to a second zone or to a further zone;
- a relative position of the first zone to a second zone or a further zone; or
- a combination of at least two or more group elements.

Note that according to embodiments, the step of analyzing is based on learning data comprising at least input data: The input data can comprise the first analysis parameter and/or a (determined) pattern (e.g. cold spot of the pavement). Alternatively or additionally, the learning parameter can comprise the first quality parameter, like an error type of the paving material at the first subportion. According to embodiments, the method comprises the step of receiving parameters of the paver and/or a configuration of the paver. These parameters/configuration information can be used as part of the learning data. Thus, the step of analyzing is based on learning data comprising at least a decision parameter defining a type or number of decision knots, wherein the decision parameter depend on a parameter of the paver or a configuration of the paver.

According to embodiments, the method further comprises a step of receiving at least one instruction assigned to a quality parameter or an error type of the paving material at the first subportion, e.g. from an operator of the paver. This helps advantageously to learn the system based on the operators experience/knowledge.

According to embodiments, the steps of receiving and analyzing are repeated for the same paving area or another paving area and/or wherein the steps of receiving and analyzing are repeated for another paver. This enables to enhance the system to further situations (second quality parameter and second analysis parameter, assigned with each other). Here the second quality parameter/second analysis parameter may refer to comparable situations (when compared to the first quality parameter/first analysis parameter) or to a completely new situation.

According to embodiments, the plurality of measurement points within the thermal profile are arranged in accordance to a regular grid. According to embodiments, the method is performed for a plurality of temperature profiles, or wherein the method is performed for a plurality of temperature profiles overlapping each other.

Another embodiment provides an apparatus for detecting a data set comprising at least a first quality parameter and a first analysis parameter. The apparatus comprises an interface for receiving a first thermal profile and a calculation unit for analyzing the first thermal profile in order to detect segregated spots of the paving material within the portion. The analyzing processed by the calculation unit is performed as discussed above.

According to embodiments, the calculation unit is based on artificial intelligence and/or configured to perform a self-learning algorithm.

It should be mentioned that according to embodiments, the training of the artificial intelligence algorithm is performed in a cloud or in a mainframe computer. This means that the images/thermal profiles are recorded by respective construction machines and transmitted as training data to the central unit. The tagging can be performed manually, by assigning respective quality parameters to the images used as training data, or automatically. The quality parameter together with the images form the training data. The improved software can then be transmitted to the respective construction machine, e.g., as update. Based on the new training data, the updated algorithm performed on the construction machine for determining the problematic spots based on the thermal profile can be improved. Background for the "outsource" of the training algorithm is that this process often involves high computing power.

The above embodiments are based on assigned pair of analysis data and quality data enabling a good determination of problematic spots. This data set can be enhanced by adding respective instructions/construction machine parameter changes which enable to avoid the determined problematic spot. This enhance data set can also be transmitted to the construction machine. Due to the implemented algorithm for evaluating the pavement quality based on a thermal profile it is possible to verify the effectiveness of the recommendation/instructions/changed machine parameter. This newly recorded data can be used again as training data. In such a case the instructions/machine parameter are taken into account when performing the learning algorithm (e.g. at the mainframe computer).

According to embodiments, the apparatus comprises a thermal profile camera or an asphalt temperature scanner that is configured to record the thermal profile of the portion, when directed to the paving area. According to embodiments, the apparatus comprises a mobile device and/or a display which is configured to output information and/or instructions; additionally or alternatively, the apparatus comprises a mobile device or a control unit receiving information on the quality parameter from the operator. The apparatus may according to embodiments comprise a wireless communication module, which is configured to exchange with the server a set comprising the first analysis parameter together with the first quality parameter.

Another embodiment provides a computer program for performing the above method. An additional embodiment provides a paver comprising the above discussed apparatus.

Before discussing embodiments of the present invention taking reference to enclosed figures in detail, an application of the above embodiments will be discussed taking reference to application examples. The above embodiments enable to detect a data set comprising at least a first quality parameter and a first analysis parameter. Based on this data set, it is possible to evaluate a quality of paving material. Application examples describe how this evaluation process can be done. According to a basic application example, a method for controlling a quality of a paving material distributed along a paving area using a paver is provided.

The method comprises the two basic steps of receiving at least one thermal profile, e.g. from an infrared camera, belonging to a portion of the paving area in which the paving material is distributed and analyzing the at least one thermal profile in order to detect segregated spots of the paving material within the portion. The thermal profile comprises a plurality of temperature values assigned to respective measurement points, which may be arranged in accordance to a grid. The analyzing comprises three substeps, namely the determining of a first zone of measurement points arranged adjacent to each other and having temperature values within a predetermined range, wherein the first zone is at least partially surrounded by measurement points having temperature values out of the predetermined range. The next substep is analyzing an orientation of the first zone with respect to a travel direction of the paver (e.g. so as to determine wherein the first zone or substantially orientated along or perpendicular to the travel direction). The last substep is assigning an indication, in particular an error indication or the like, of a respective type to the portion based on the analyzing of the orientation.

According to an enhanced application example, the method comprises the step of analyzing a temperature deviation within the portion, e.g. so as to find out a deviation of the temperature values of the first zone from a minimum or maximum temperature value within the portion or from the temperature values belonging to measurement points surrounding the zone. According to another application example, the analyzing of the thermal profile comprises another substep, namely the determining of a second zone of measurement points (laying adjacent to each other and having temperature values within another predetermined range, wherein the second zone is at least partially surrounded by measurement points having temperature values out of another predetermined range or wherein the second zone abuts the first zone) and analyzing the orientation of the second zone with respect to the travel direction.

In general, some application examples may be based on the finding that there are some criteria like the orientation of temperature spots and the temperature deviations within an examined paving area enabling the real-time interpretation of the thermal data such that potential causes of segregation can be identified and automatic communication of possible solutions to the paving crew can be given. In order to support the paving crew a recognized pattern, in particular an error pattern or the like, within the thermal profile is identified and assigned to a predetermined pattern type or predetermined error type. The assignment of the pattern type or error type enables to output instructions/hints to the paving crew to avoid the typical causes for the pattern or errors (thermal segregation) of the respective type. An example for such a communication to the paving crew may be a real-time alert for a paving operator or paving supervisor in the event of severe segregation problems. The main advantage is that the described system analyzes the thermal data and gives advice by itself, without the help of the paving crew. It is therefore independent of the experience of the machine operator or paving crew or a paving specialist. Application examples of the present invention also have the advantage that the measured temperature profile is analyzed continuously and without interruption by the system. When having a look at conventional technology, it is not guaranteed that the machine operator always looks at the display of the operating and display unit during the paving process and detects every problem that may arise. As a result of the continuous monitoring, the overall quality of the road to be produced is increased.

According to an application example, the analyzing of the temperature deviation may have different variants. For example, for analyzing the temperature deviation a substep of determining a temperature gradient from one of the measurement points belonging to the first zone to one of the measurement points out of the zone may be performed in order to detect whether the temperature gradient is below or above a predefined threshold, e.g. 25° Fahrenheit (150° F. vs. 175° F.) or 50° Fahrenheit (150° F. vs. 200° F.) (approximately 14 or 28° Celsius). In the US, the thresholds of 25 and 50° Fahrenheit are the standard variation definitions for 'moderate' and 'severe' segregation, whereby these threshold definitions have to be seen as an example and can vary in view of other paving practices with different materials, widths and depths. For example, classifications of below 25 degrees Fahrenheit (14 degrees Celsius) for minimal or no segregation, between 25 and 50 degrees Fahrenheit (14 and 28 degrees Celsius) for moderate segregation and above 50 degrees Fahrenheit (28 degrees Celsius) for severe segregation, over a 150 feet section are what work best for a lot of US paving practices. But it has to noted that these temperature and distances variables were chosen based on studies performed on projects consisting of average US paving practices. Alternatively or additionally, the point-to-point comparison may be performed for two different zones. According to another application example, all temperature values of a portion may be analyzed so as to determine the minimum and the maximum temperature within the portion. This enables to compare one of the temperature values of the first zone to the maximum or minimum temperature value within the portion.

According to an application example, different pattern or error indications can be detected. Here a differentiation between five types (type A to type E) may be done. An error or a pattern indication of the type A can, for example, be detected, when the first zone is arranged perpendicular or substantially perpendicular to the travel direction. Another indicator for an error or a pattern of a type A is the perpendicular arrangement of the first zone and a temperature variation below a predefined threshold of for example approximately 25 or else 50° Fahrenheit (approximately 14 or else 28° Celsius). An error or a pattern of the type A results in minimal to moderate end-of-load segregation which is seen as coarser locations in the paving material and/or have higher air voids. According to application examples, an instruction can be output to an operator of the paver. The instruction may comprise one of the following comments:
  ensuring that rows are overlapping when placed;
  ensuring that row placement is not at too extreme distances in front of the paver; and
  ensuring that the pile height in paver hopper and/or material transfer vehicle hopper remains consistent and at acceptable levels.

According to an application example, an error or a pattern of type B can be indicated when the first zone and a second zone are arranged perpendicular to the travel direction and when at least one cold zone is arranged between a first and a second zone. The cold zone comprises temperature values which are reduced by at least 50 degrees Fahrenheit (at least 28 degrees Celsius) when compared to the temperature values of the first and second zones. Another indicator for an error or a pattern of type B is the above-described arrangement of the first, second and cold zone in combination with a high temperature variation above a predefined threshold of for example approximately 50 degrees Fahrenheit (approximately 28 degrees Celsius). An error or a pattern of type B indicates a severe end-of-load segregation. In case of an error or a pattern of type B, the method may, according to further application examples, comprise the additional step of outputting an instruction to the operator having the following content:
  ensuring that rows are overlapping when placed;
  ensuring that a row is not being put down at distance in front of paving causing extreme cool down prior to the paver getting to the paving material;
  ensuring that the paver hopper and/or material transfer vehicle hopper are not being depleted and hopper wings are not being folded between loads; and
  ensuring proper multi-drop loading of trucks.

According to an application example, an error or a pattern of type C may be identified and indicated. An error or a pattern of type C is present, when the first zone and a second zone are arranged transversal/along the travel direction and when one or more cold zones are arranged in-between. Another additional indicator is a temperature variation (seen over the entire portion) of above a predefined threshold of for example approximately 50 degrees Fahrenheit (approximately 28 degrees Celsius). Such an error or a pattern of type C leads to false segregation and may be caused by prolonged stopping and excessive screed heat at slow paving speed. In this case, the method may output an instruction to the operator comprising the following content:
  minimizing stop times; and
  monitoring thermal images of screed stamps at stoppages and reduce screed temperature.

According to an application example a type D error or pattern may be indicated, wherein the first zone extends transversal along the travel direction and is centered. An additional indicator is a temperature variation below approximately 50° Fahrenheit (approximately 28° Celsius). In this case, the method may output instructions to the operator comprising the following content:
  examining material movement at the site to determine, if other extensions may be used for the consistent flow;
  considering adding mainframe extensions; and
  ensuring that the kickback pedals are in good conditions.

According to an application example, an error or a pattern of type E may be indicated when a first zone, a second zone and a third zone divide the portion into different zones along the travel direction, i.e. at least three perpendicularly arranged zones. Here, an additive indicator is the temperature variation above a predefined threshold of for example approximately 50° Fahrenheit (approximately 28° Celsius). An error or a pattern of type E results in a load-to-load segregation. Here, the method may output the instruction to the operator of:
  ensuring consistent tracking operations; and
  ensuring consistent mixing plant operations.

Regarding the above method, it should be noted that according to an application example, a plurality of portions of the area are investigated by the above method. The plurality of portions typically overlap each other since the analysis of the segregation is performed continuously, wherein the overlap results from the traveling of the paver along the traveling direction.

Another application example provides an apparatus for performing the above method, namely an apparatus for detecting the quality of a paving material distributed along a paving area. The apparatus comprises at least an interface for receiving the thermal profile, and a calculator for performing their analysis.

According to an application example, the apparatus may additionally comprise a thermal profile camera or asphalt temperature scanner for recalling the one or more thermal profiles.

According to an additional application example, the apparatus may comprise a position sensor, like a GPS sensor for measuring the position of the paving machine continuously and to add position information to the temperature profile and the advice given by the inventive temperature measurement system. According to another application example, the apparatus comprises a mobile device or a display for outputting the information/instructions. This mobile device or display enables an invent monitoring. According to another application example, the apparatus comprises a wireless communications module, which is configured to send a real-time alert in the event of severe segregation problems and/or no segregation problems via a wireless communications link to:
- a mobile device (Smartphone and/or Smartwatch) of the supervisor of the construction site;
- a computer, Tablet-PC or the like in a supervisor office far away or nearby the construction site;
- one or more roller compactor drivers behind the asphalt paving machine so that the roller drivers can be informed about problems with the asphalt paving process. The roller drivers can then for example adjust, modify or optimize parameters, settings, etc. of the roller compactor; and/or
- a data server far away so that for example truck drivers and/or the crew of an asphalt mixing plant can be informed about problems with the asphalt material.

The real-time alert can be sent for example via a CAN-WLAN-Gateway module (wireless communications module), which is arranged on the machine and is an interface between a machine communications bus system, for example CAN (Controller Area Network) or the like, and a wireless communications system, for example WLAN, Bluetooth or the like.

In the event of no segregation problems, such a real-time alert can be for example outputting a positive message or confirmation when there are not any (error) indications in a specified section or distance of approximately 150 feet.

According to embodiments, the method further comprises the step of outputting instructions to the paving crew based on the first quality parameter. This has the purpose to implement an action or to change parameters of the construction machine based on the quality parameters; additionally or alternatively, the method further comprises the step of determining the first analysis parameter (again) after outputting the instructions or after implementing the action or after changing the parameter.

Advantages of the application examples are to give contractors a means to positively affect quality of a paving material distributed along a paving area using a paver.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
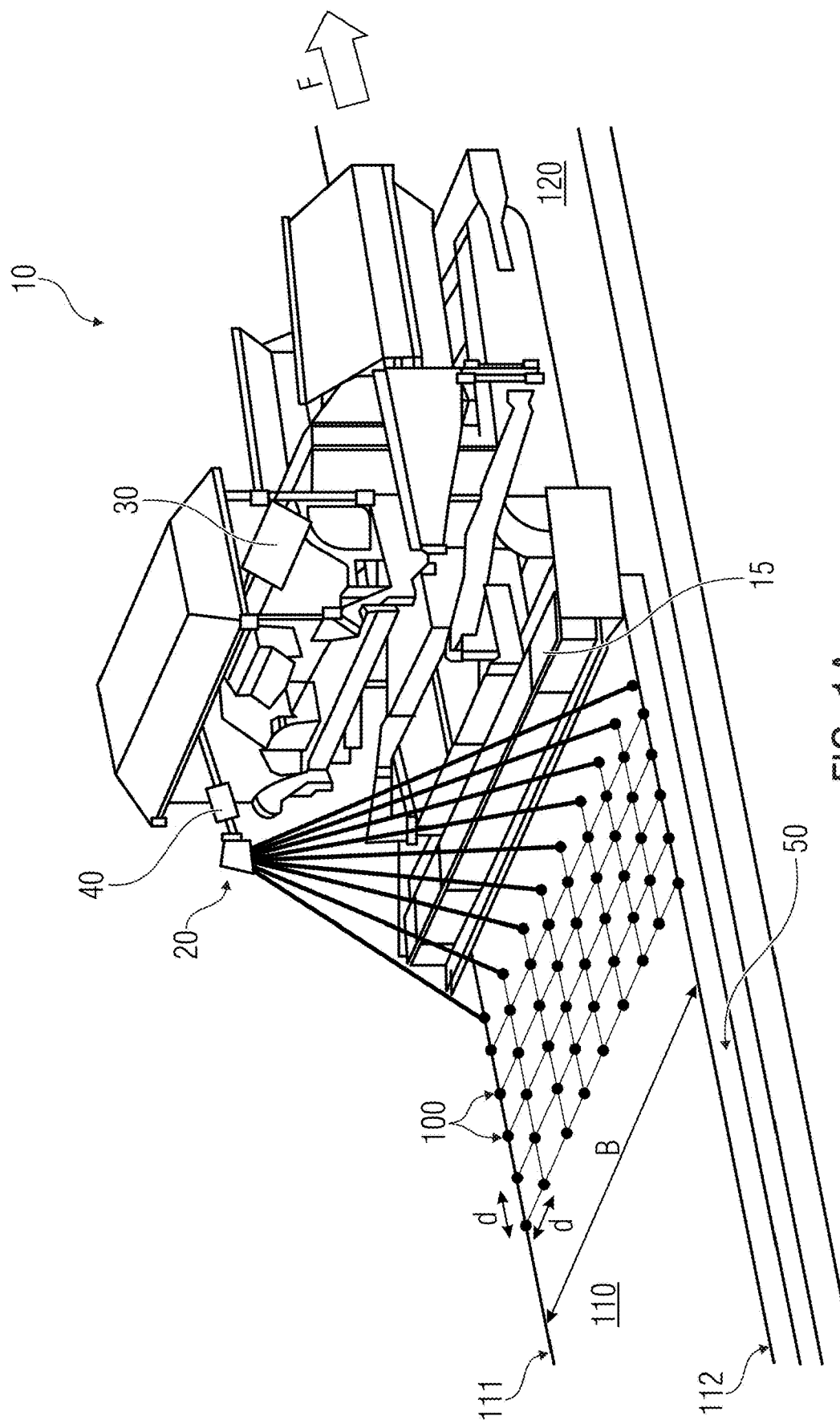
FIG. 1a shows a schematic representation of a paver, here an asphalt paving machine comprising an apparatus for controlling the quality of the distributed paving material according to a first application example.

Below, the present invention will subsequently be discussed referring to the figures, wherein identical reference numerals are provided to elements having identical or similar function so that the description thereof is mutually applicable and interchangeable. Before discussion embodiments of the present invention, the background for self-learning algorithm will be discussed.

Embodiments of the present invention start from a method for controlling and an apparatus for detecting a quality of a paving material distributed along a paving area using a paver (quality control systems in the field of road construction machines, for example asphalt paving machines, based on temperature measurements of the new laid material such as asphalt or bitumen, right behind the machine or the tool (screed), as it is disclosed by the EP 3456880 A1). Embodiments provide a learning modus based on artificial intelligence/self-learning algorithms. For the real time interpretation of the thermal data in the software of the operating and display unit it may be useful to have thermal data patterns stored in the memory of the operating and display unit in order to compare it with current measured temperature profiles. These comparison data can be generated by AI/self-learning algorithms enabling to determine or to add new thermal data patterns (new thermal profile layouts describing root causes of thermal segregation). It is optionally possible that the machine operator or the paving crew or a paving specialist has to validate the decisions taken by the system.

In FIG. 1a road finishing machine 10, e.g. an asphalt paving machine, is schematically illustrated. The direction of travel of the road finishing machine 10 is illustrated by an arrow F on the ground 120. To distribute the paving material on the ground 120 and to form a road surface 50, the machine 10 comprises a screed 15, which is attached to the rear end of the machine 10.

Furthermore, the machine 10 comprises a temperature measurement unit 20 at its back end, which can for example be a thermal profile camera or an asphalt temperature scanner. An optional weather station 40, which exemplarily determines the wind speed and the ambient temperature in the region of the road finishing machine 10, is also arranged in the region of the temperature measurement unit 20. The temperature measurement unit 20 measures the temperature of the surface 110 of the newly applied road surface 50 over the road width B which is limited laterally, i.e. transverse to the direction of travel of the road finishing machine 10, by the outer edges 111 and 112. Thus, the measuring values are recorded at the measuring points 100 illustrated schematically and arranged in advantageously, but not necessarily, equal distances d transverse and/or along to the direction of travel of the road finishing machine 10.

Dependent on the exact implementation of the measurement unit 20, the measurement points 100 may be arranged in order to record a temperature profile having two dimensions or just may be arranged transversal to the travel direction F, such that the thermal profile having the two dimensions is recorded during the traveling along the travel direction F and composed by a plurality of measurements along the travel direction F.

Figure 2:
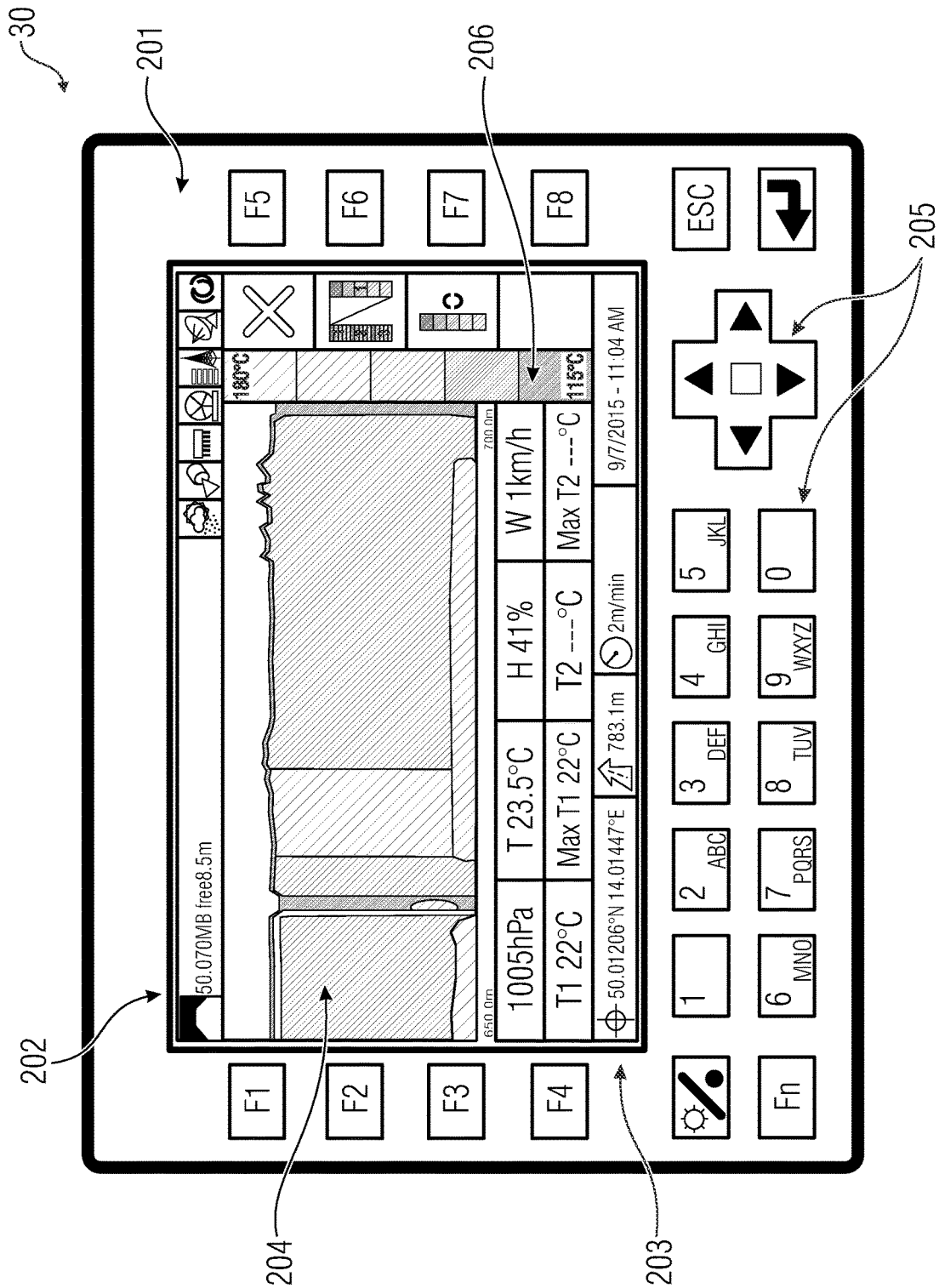
FIG. 2 shows a schematic representation of a control unit belonging to the apparatus for controlling the quality.

The road finishing machine 10 of FIG. 1*a* may comprise an operating and display unit 30 which is electrically connected to the temperature measurement unit 20, which comprises at least a CPU for performing the analysis. The operating and display unit 30 can be mounted near the control platform of the paver, as shown in FIG. 1*a*. But it is also possible that the operating and display unit 30 is mounted at any other point of the machine, for example and advantageously at the screed 15, so that the paving crew can view to the display screen easily. The operating and display unit 30 is comparable to a mobile computer and comprises at least a microcontroller, one or more memory units (RAM, ROM, Flash . . . ) and one or more input and output devices, for example a touch display screen. The operating and display unit 30 shows the measured temperature profile of the surface 110 of the newly applied road surface 50 as a graphical illustration on an output device (display screen), as shown in FIG. 2. Examples of such a graphical illustration are shown in FIGS. 4 to 9 and described in more detail later on.

A machine operator or the paving crew (not shown) are able to see the measured temperature profile of the new paved road 50 on the display screen of the operating and display unit 30. FIG. 2 shows an example of a front side 201 of an operating and display unit 30. In the middle area is a display screen 202, advantageously a touch display screen. Left, right and below the display screen 202 are a lot of input keys 205. In the middle area of the display screen 202, a measured temperature profile 204 is graphical illustrated. Above, right and below the temperature profile 204, some symbols 203 are shown. Some of the symbols 203 show data or information of the current paving process, for example paver speed of 2 m/min, wind speed of 1 m/min, humidity of 41% and so on.

For the operator or the paving crew, the information shown by the unit 30 is very helpful, wherein the information has to be continuously monitored. In order to improve the reliability an automatic controlling of the paving quality can be performed, when rules are present for interpreting the thermal pattern. This approach will be discussed referring to FIG. 1*b*.

Figure 1B:
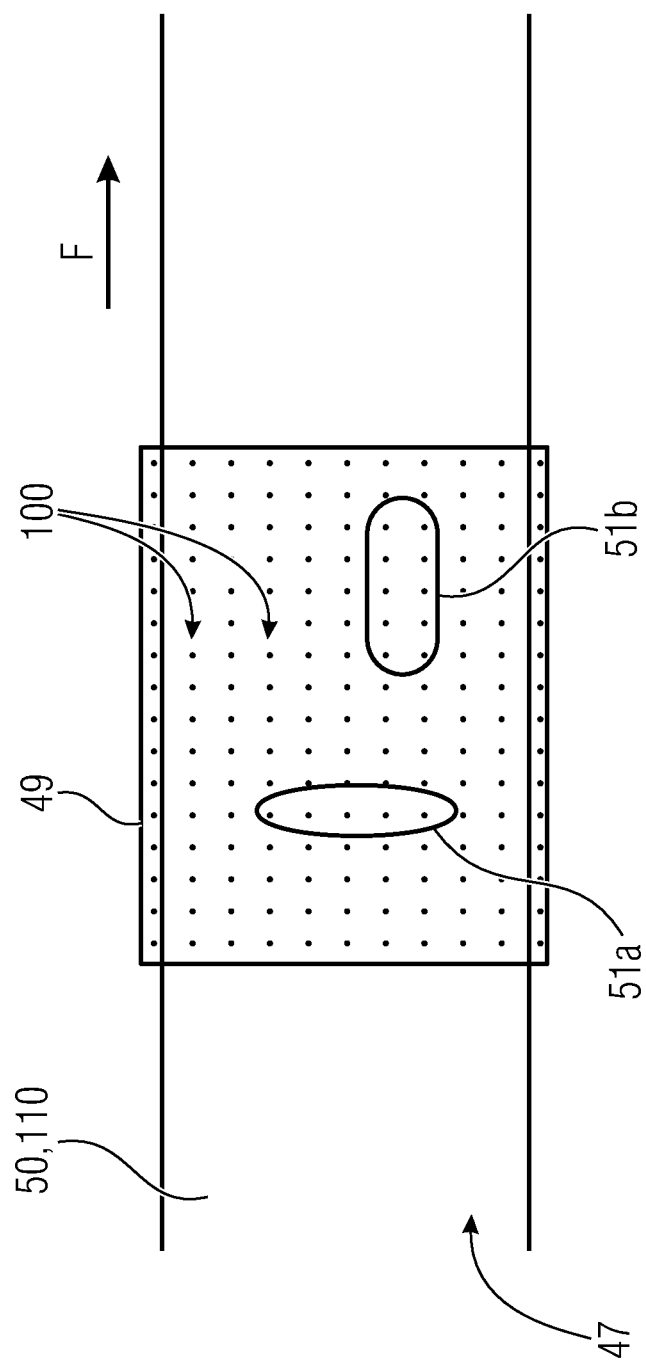
FIG. 1b shows a schematic representation of a paving area for illustrating the principle of analyzing a thermal profile according to the first application example.

FIG. 1*b* shows a schematic illustration of the paving area 47, along which the paving material 15 has been distributed using a paver which travels along the traveling direction F. The surface 110 of the newly applied road 50 is analyzed using a thermal profile camera, or an asphalt temperature scanner, as discussed with respect to FIG. 1*a*. The means for determining the thermal profile capture at least a portion of the area 47, which is marked by the reference numeral 49. Within the portion 49 of a plurality of measurement points 100 are arranged, for each measuring point a respective temperature value is available.

Measurement points arranged next to each other and having comparable temperatures, i.e. temperature values within a predetermined ranged, i.e. between 170 to 190° Celsius can be grouped to a common zone.

Here, exemplarily, a first zone 51*a* and a second zone 51*b* are shown. The first zone 51*a* is arranged perpendicular to the travel direction F, i.e. transversal with respect to the pavement 15, wherein the zone 51*b* is arranged along the travel direction F. Both zones 51*a* and 51*b* are typically surrounded by a plurality of measurement points having temperature values out of the predetermined range. Alternatively, two zones may be arranged next to each other, such that just a few or nearly no measurement points out of the predetermined ranges are arranged in-between. In general it should be noted that each zone 51*a* and 51*b* is formed by a temperature deviation between the local spot and the surroundings.

The orientations along which the zones 51*a* and 51*b* are arranged give a good hint to the causes for the temperature variations. Another indicator to different causes is the temperature deviation itself. Here, a plurality of approaches can be performed. For example, the temperature deviation between a zone, e.g. 51*a* and the surrounding can be analyzed. According to another approach, the temperature deviation between the two zones 51*a* and 51*b* can be detected. Alternatively or additionally, the temperature within one zone of the average temperature within one zone (e.g. within the zone 51*a*) can be compared to a minimum or a maximum temperature value of the portion 49.

Regarding each zone 51*a* and 51*b* it should be noted typically the temperature deviation within a corresponding zone 51*a* and 51*b* amounts to the maximum of 30% or 20% or according to embodiments to at least 10%, wherein the percentage refers to ±from the average temperature within the zone 51*a* and 51*b*.

The above mentioned automatic approach for controlling the paving quality comprises the step of determining the corresponding zones 51*a* and/or 51*b* and analyzing the orientation of the first zone. Based on the orientation and, according to further examples, in combination with a temperature deviation, an assignment of an indication, in particular an error indication or the like, can be performed for the respective portion 49.

Starting from this assignment throughout a respective pattern type or error type (type A-type E), an instruction to the operator helping him to improve the recent situation can be output. This step of outputting the instruction may be performed by use of the display unit 30 or the mobile device.

Below, with respect to FIGS. 4 to 9 different temperature profiles will be discussed, wherein each temperature profile can be assigned to a respective pattern indication or error indication. FIGS. 4 to 9 show several different measured temperature profiles of the new paved road 50, respectively the surface 110 of the newly applied road surface 50 over the road width B, whereby the different hatching in the illustrated graphics stand for different temperatures shown in hatching temperature gradient pursuant to FIG. 3. Other temperature gradients (e.g. color gradients, like Rainbow temperature color gradient or Iron temperature color gradient) are known, for example, see reference sign 206 in FIG. 2.

Figure 3:
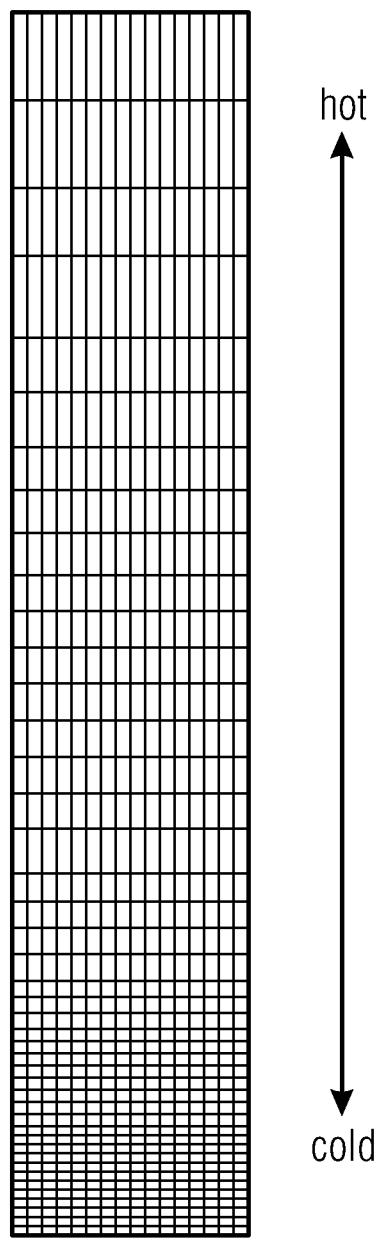
FIG. 3 shows a schematic caption indicating different temperature levels of thermal profiles.

In FIG. 3, and also in FIGS. 4 to 9, hot temperatures are marked by a closer hatching, cold temperatures are marked by a lighter hatching, whereby hot temperature means a temperature of approx. 356° Fahrenheit (approx. 180° Celsius) and cold temperature means a temperature of approx. 203° Fahrenheit (approx. 95° Celsius).

Figure 4:
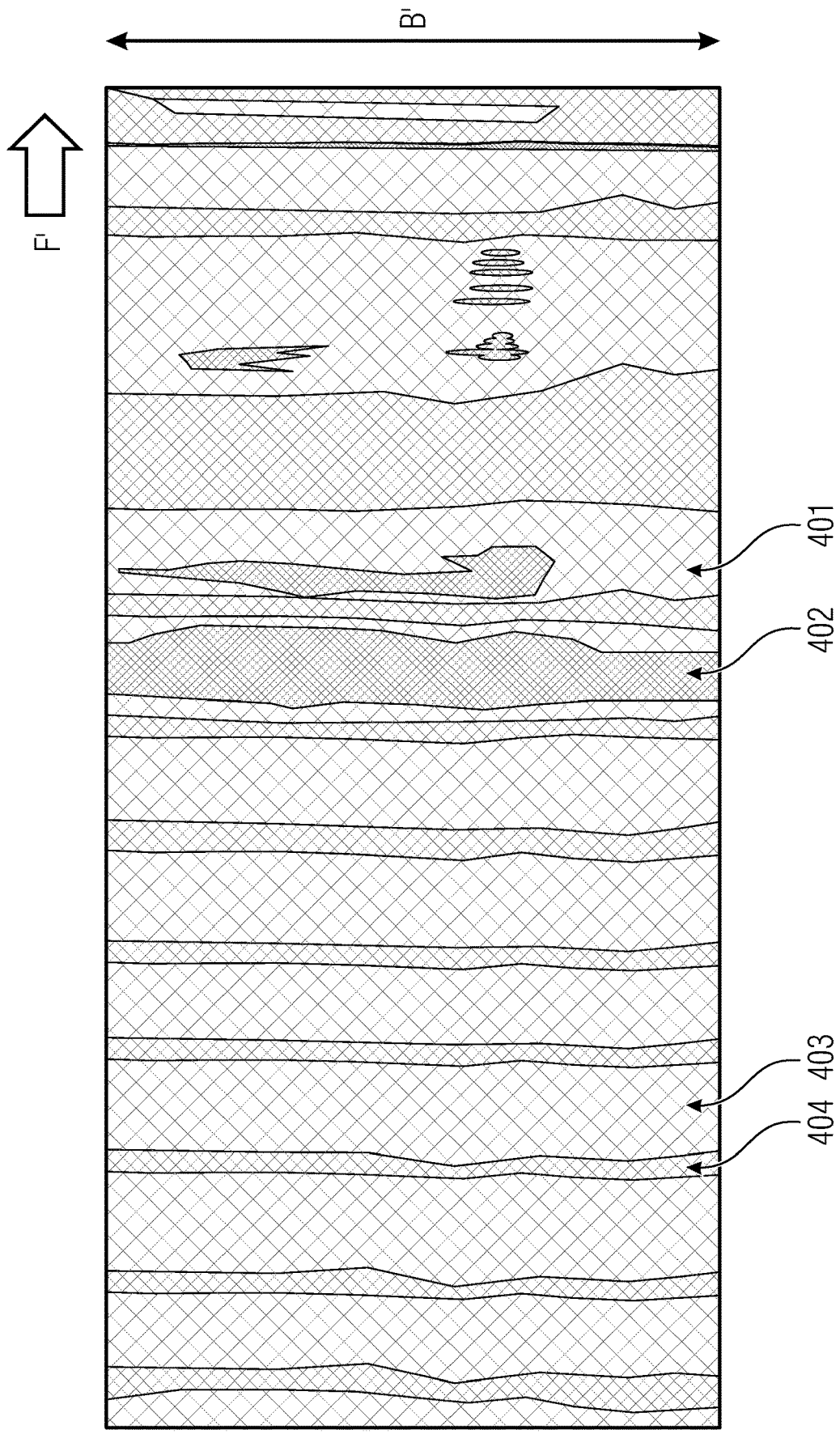
FIGS. 4-8 show a schematic thermal profile belonging to distributed pavements having areas assigned to different pattern types or error types for illustrating the principle of determining the different pattern types or error types within the thermal profiles according to application examples.

The distance B' and the direction F', only shown in FIG. 4 but applies to all FIGS. 4 to 9, correspond to the road width B of the newly applied road surface 50 and the direction of travel F of the road finishing machine 10 (see FIG. 1*a*). FIGS. 4 to 9 show in detail different thermal segregation problems which can occur during a paving process. In the following, the measured temperature profiles, the thermal segregation problems, its root causes and possible solutions are described in more detail.

Some parts of the following description refer to a so called windrow paving. In such pavers, the hot paving material is not dumped directly into the paver hopper. Instead, it is deposited as a windrow directly on the roadway ahead of the paver. Such windrow pavers provide a loader conveyor which picks up the paving material and loads it into a hopper. Thereafter, the paving material moves by a second conveyor to a location ahead of a lateral auger and screed in the same general manner as paving machines with a hopper which receive hot asphalt paving material directly from a dump truck.

FIG. 4 shows a typical temperature profile of a pattern indication or an error indication of type A. Here, the thermal variation levels show minimal to moderate end-of-load segregation, which is typically seen as a coarser location in the asphalt matter and will have higher air voids making the asphalt more susceptible to early distress due to oxidation, moisture penetration or resulting in raveling and pot holes.

The variation temperature sections, for example, rows 401 to 404 of FIG. 4 have different temperature deviations (thermal variation levels) transversally to the direction of the travel F, F', of the road-finishing machine 10. As can be seen in this example, the overall temperature deviation is limited to approximately 50° Fahrenheit (approximately 28° Celsius).

In order to improve the shown situation, there are three possible solutions. If windrow paving, ensure rows are overlapping when placed. If windrow paving, ensure row placement is not to extreme distances in front of paver. Ensure pile height in paver hopper and/or material transfer vehicle (material feeder) hopper remain consistent and at acceptable levels.

Figure 5:
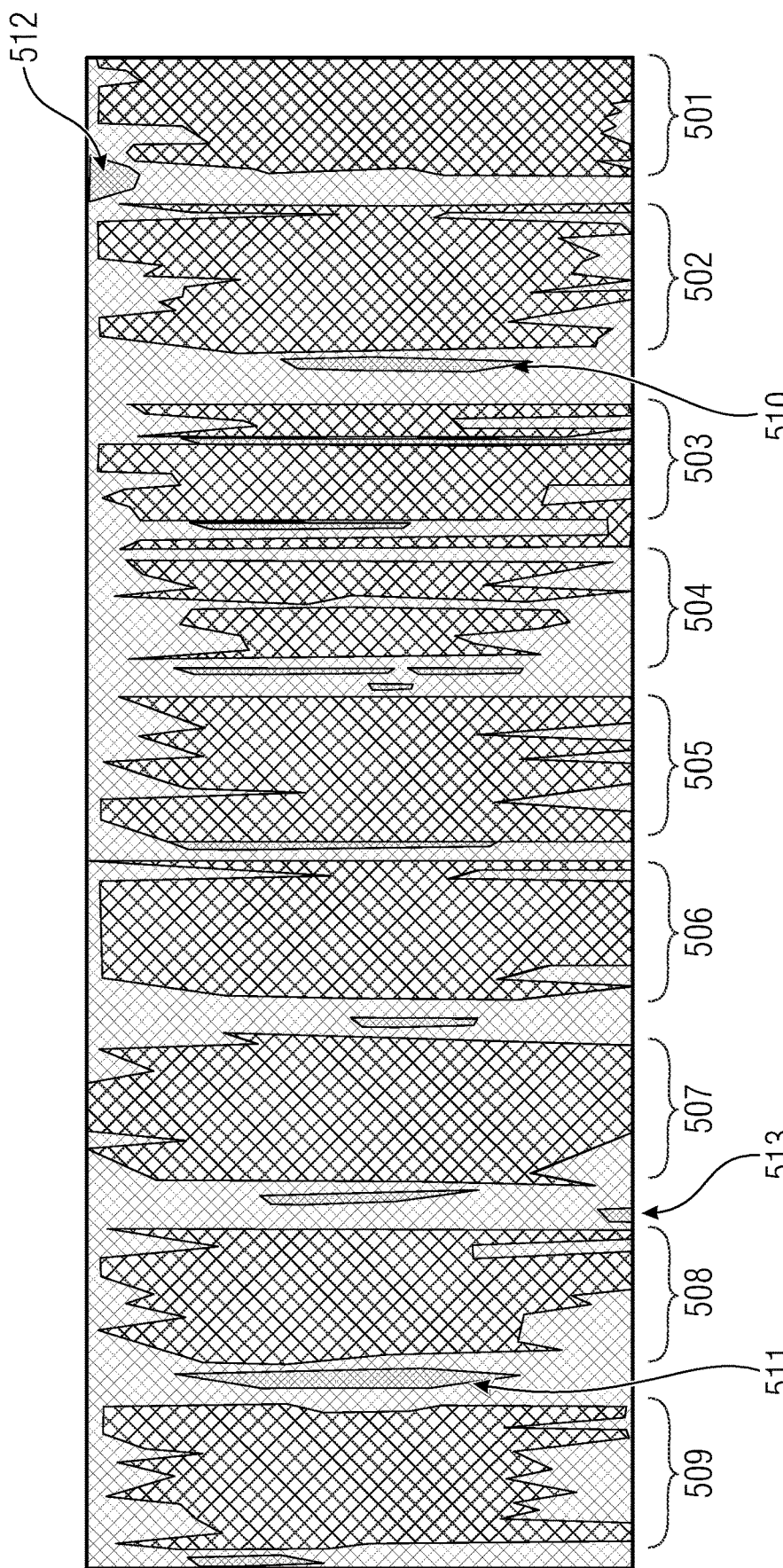

FIG. 5 shows thermal variation levels having severe end-of-load thermal segregation, which affects the long-term durability of the asphalt pavement concrete structure. This pattern or error indication is the type B.

The thermal pattern shows various temperature sections (see rows 501 to 509) with high temperature deviations (thermal variation levels) transversely to the direction of travel F, F' of the road finishing machine 10. Small sections of cold temperature are between some rows (see 510 and 511) and also near the outer edges (see 512 and 513).

A possible solution would be: If windrow paving, ensure rows are overlapping when placed. If windrow paving, ensure row is not being put down at distances in front of paver causing extreme cool down prior to paver getting to material. Ensure paver hopper and/or material transfer vehicle (material feeder) hopper are not being depleted and hopper wings are not being folded between loads. If end dumping into paver hopper, ensure proper multi-drop loading of trucks. Environmental conditions may dictate the need of a material transfer vehicle (material feeder) in the operation for remixing of segregated material.

Figure 6:
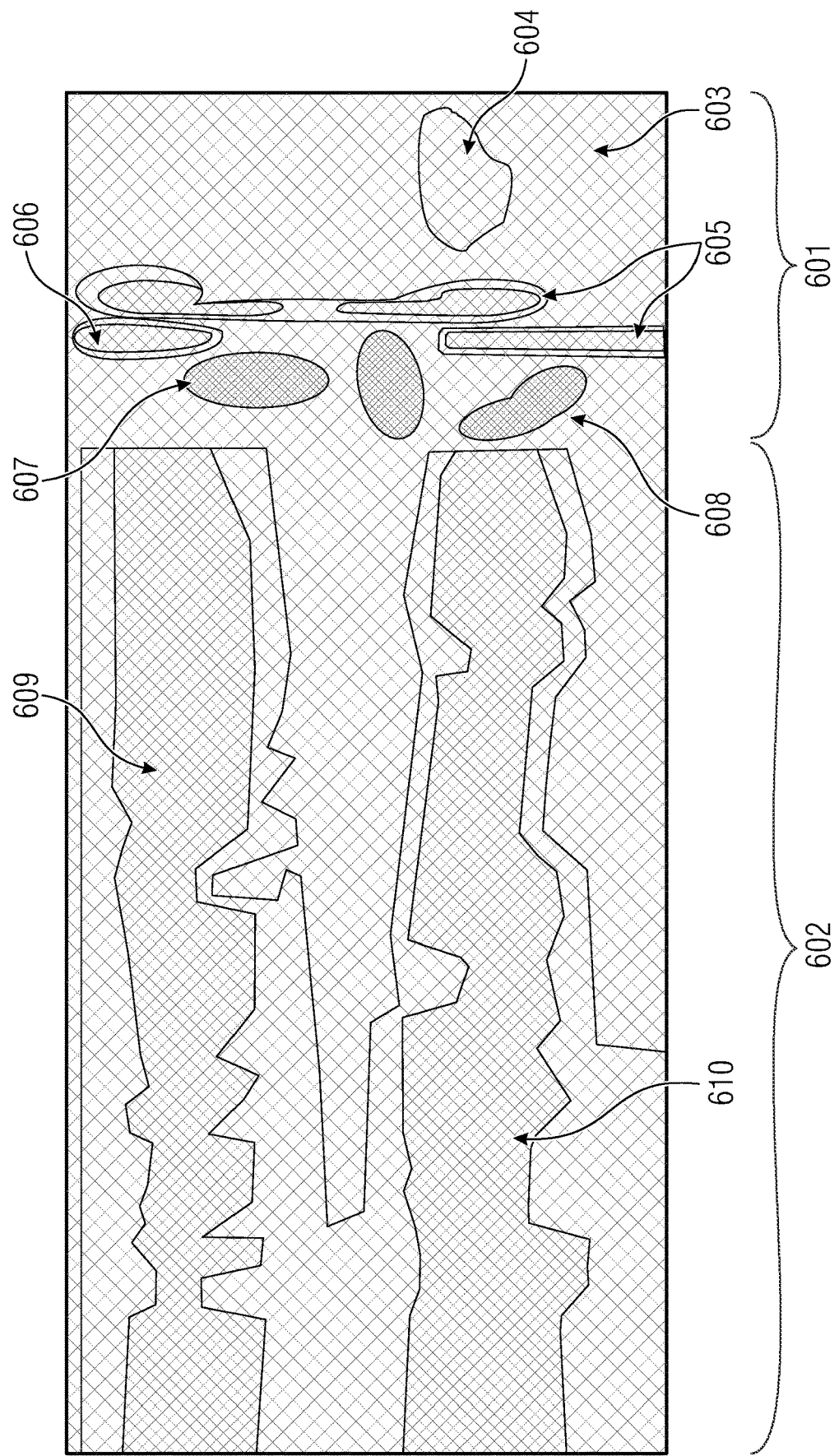

With respect to FIG. 6a pattern or an error of type C will be discussed. The thermal image of FIG. 6 shows a false segregation caused by prolonged stopping and excessive screed heat at low paving speeds. FIG. 6 shows two different areas 601 and 602 with various temperature sections. In area 601 there are several temperature sections with high temperature deviations (thermal variation levels). Sections 603 and 604 are in the medium temperature range of approx. 140 to 150° Celsius. Sections 605 and 606 are in a high temperature range of approx. 170 to 180° Celsius and run transversely to the direction of travel F, F' of the road finishing machine 10. Sections 607 and 608 are spots in the low temperature range of approx. 95 to 105° Celsius. In area 602 there are mainly two temperature sections 609 and 610 in a high temperature range alongside to the direction of travel F, F' of the road finishing machine 10.

A possible solution would be: Minimize stopping times. Monitor thermal image for screed stamps at stoppages and reduce screed temperature if possible.

Figure 7:
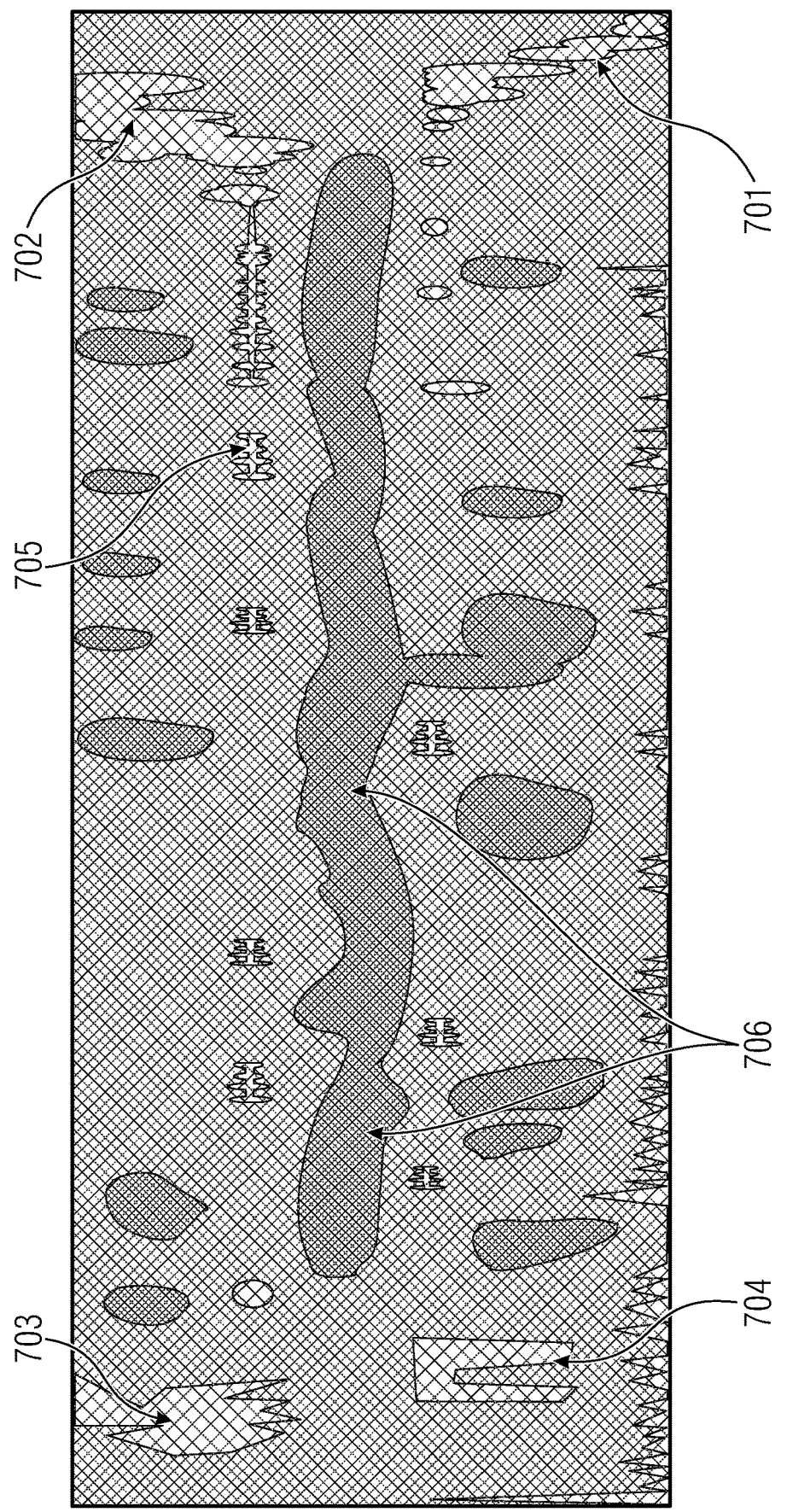

With respect to FIG. 7 a pattern or an error of type D will be discussed. FIG. 7 shows a temperature profile with some areas of thermal streaking. The image in FIG. 7 contains minimal variation due to streaking but moderate to severe thermal streaking can result in continuous segregation throughout the mat. There are mainly shown four areas 701 to 704 in a middle temperature range, whereby the area 705 shows a linear region alongside to the direction of travel F, F' of the road finishing machine 10 also in a middle temperature range. The linear region 705 starts in 702 and ends in 703. Furthermore, the area defined by the sections 706 show a center-line area in a very high temperature range (up to 180° Celsius).

Possible solution: Examine material movement at the sides to determine if auger extensions may be used for consistent flow. If material is moving forward in the end gates you may also consider adding main frame extensions. Regarding center-line streaking check to ensure the kickback paddles are in good condition. If so, raise flow gates and/or auger height.

Figure 8:
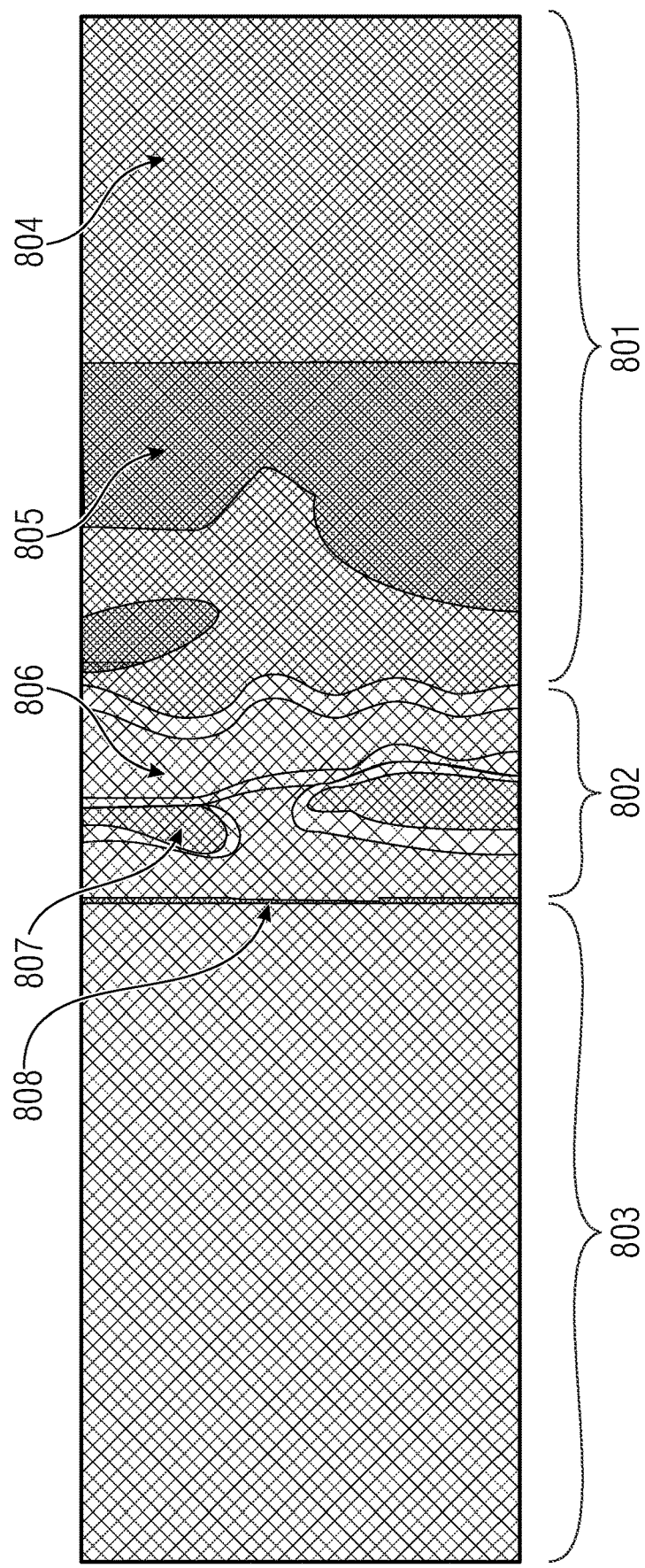

FIG. 8 describes an area inclination of the pattern or error type E. FIG. 8 shows a thermal image of a pavement having load-to-load segregations. FIG. 8 shows three different areas 801, 802 and 803 with various temperature sections. Areas 801 and 802 show several main temperature sections 804 to 807 in a middle and high temperature range and transversely to the direction of travel F, F' of the road finishing machine 10. Between area 802 and 803 there is a small border which indicates a paver stop. Area 803 shows comparable to the other both areas 801 and 802 no thermal variation levels. Possible solution: Ensure consistent trucking operations. Ensure consistent mixing plant operations.

Figure 9:
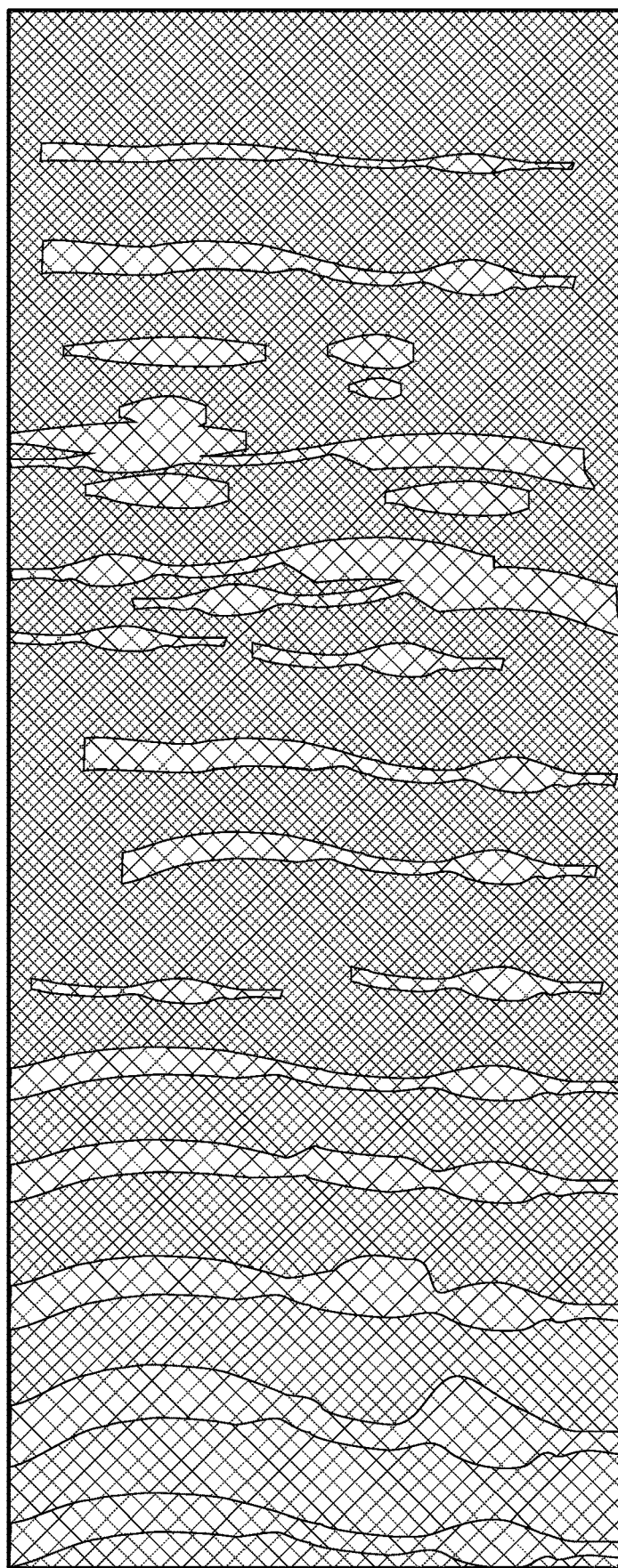
FIG. 9 shows a schematic thermal profile belonging to a distributed pavement segregation symptoms.

Just for the sake of completeness, a temperature profile showing minimal to no segregation is illustrated by FIG. 9. As can be seen, the thermal variation levels are consistently below approximately 25° Fahrenheit (approximately 14° Celsius) or less.

As discussed above, the analyzing of the temperature pattern is performed automatically, e.g. by the operating and display unit 30 (cf. FIG. 1) or a CPU of the temperature measurement system. Based on the analysis, the system can output using a mobile device or display instructions for the operator and the crew. The instructions can comprise a real-time per load. The real-time alert can include further information, for example the analyzed potential causes of segregation and/or the suggested possible solutions given to the paving crew. Out of the given alert and provided information, the truck drivers and/or asphalt mixing plant crew can adjust, modify or optimize parameters, settings, etc. of the asphalt production and transportation process. These could be for example to change the temperature of the asphalt mixing process or to minimize the number of trucks which are on the way from the asphalt mixing plant to the construction site (in order to minimize a waiting time of the asphalt trucks in front of the asphalt paving machine).

According to another example, the output of the instructions can be performed using network technologies, such that the instructions can be given to the asphalt mixing plant, if the occurred segregation problems are caused by the wrong asphalt mixture.

Although within the above examples, the temperature measurement unit has been characterized as a thermal profile camera or asphalt temperature scanner directed to the new paved asphalt mat behind the asphalt paving machine, it should be noted that also other measurement principles, like the usage of a plurality of sensors are possible, if the measurement principle enables to capture a thermal profile.

According to another embodiment, a so-called learning modus can be used. This learning modus, also referred to as teach-in modus, has the purpose to add new thermal data patterns (new thermal profiles describing recourses of thermal segregation) to the already available data sets or to generate a new data set. According to an implementation, this learning modus is automatically or semi automatically performed, e.g., by use of artificial intelligence or, in general, self-learning algorithms.

Below, taking reference to FIG. 10, the corresponding method 1000 will be discussed.

Figure 10:
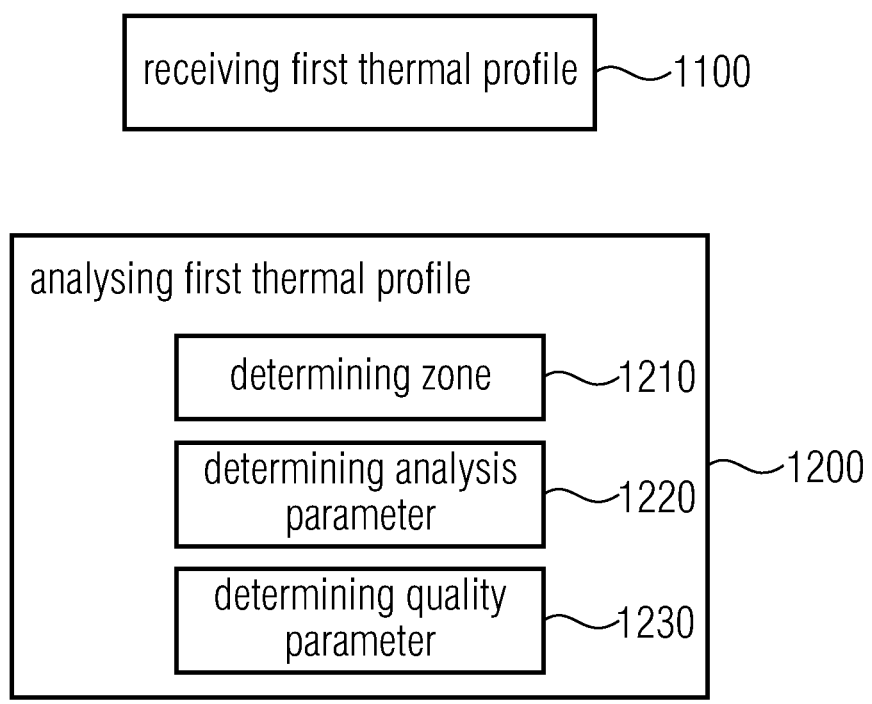
FIG. 10 shows a schematic flowchart of a method detecting a dataset enabling to evaluate a quality of a paving material.

FIG. 10 illustrates a method 1000 of detecting a data set comprising at least a first quality parameter (e.g. describing an error type) and a first analysis parameter (e.g. a specific thermal pattern or in general a parameter enabling a conclusion regarding the quality of the pavement, where this analysis parameter is, for example, determinable within an image/thermal profile).

The first quality parameter and the first analysis parameter described together a recognizable situation, e.g. comprising a typical error together with a typical parameter for identifying said error. The first quality parameter or in general, the one or more quality parameters can be an information on an error/error type or also a measured value, e.g., the evenness of the pavement, etc. The analysis parameter describes a parameter for characterizing the first zone, e.g., a spot, within which the error is detectable. A zone is defined as measuring points arranged adjacent to each other and having all temperature values within a predetermined range, e.g., at least 10% higher than the temperature values of the measuring points partially surrounding the first zone. When seen to local assignment, the first zone corresponds to a first subportion of a portion of the paving area. The first subportion is the area within which the first quality parameter is determined. Both parameters, the first quality parameter and first analysis parameter together form the data set based on which it is enabled to evaluate a quality of a paving material by use of the above discussed system. The (semiautomatic/automatic) determination of the data set can be done using the method 1000 comprising the two basic steps 1100 and 1200.

Within the step 1100, a first thermal profile of the portion of the paving area in which the paving material is distributed is received. The portion comprises a first subportion, It is assumed that within said first subportion a locally limited quality situation, e.g. an error, exists. Temperature values for the points of the first subportion are included by the first thermal profile, wherein a first zone of measuring points are assigned to the first subportion. Expressed in other words, the first thermal profile comprises a plurality of temperature values assigned to respective measurement points of the portion, wherein a selection of temperature values are referred to first zone and belong to the measure points of the first subportion. Of course, beside the first subportion (portion of interest/to be analyzed) the entire portion can comprise further/second subportions assignable to further/second zones within the thermal profile.

The next basic step is analyzing the first thermal profile. This step is marked within FIG. 10 by reference numeral 1200. This step of analyzing 1200 comprises three substeps 1210, 1220 and 1230.

Within the step 1210, the first zone of measuring points adjacent to each other and having temperature range within a predetermined range is determined. This first zone is at least partially surrounded by measuring points having temperatures out of the predetermined range, e.g., forming a second zone or continuous area. For example the first zone can be interpreted as spot having very high temperature values, i.e. a so-called hot spot within the entire temperature profile.

Within the next step 1220, a first characteristic analysis parameter for the first zone is determined. For example, an average temperature of the temperature values within the first zone or a relative temperature of the temperature values within the first zone when compared to the temperature values belonging to the measurement points surrounding the first zone can be determined as first characteristic analysis parameter. Additionally or alternatively, the geometry of the first zone, e.g., the orientation with respect to a travel direction of the first zone or the size or the shape of the first zone can be determined as characteristic analysis parameter. One or more of these analysis parameters are used to enable e recognition of zone for which it is assumed that a comparable recognizable situation/comparable error can occur. Preferably, more than one or all analysis parameters are used describing the first zone in high detail.

For the subportion corresponding to the first zone within the first thermal profile a quality parameter, e.g. the evenness or an error type is determined within the step 1220. According to embodiments, this quality parameter can be manually determined, i.e., by the operator. Possible variants, are manual measurements, e.g. of the evenness or visual inspection of the segregation. The result of this step 1220 is that a respective first analysis parameter or a respective first set of analysis parameters is assigned to a respective quality parameter.

In the step 1230 the combination of the analysis parameter(s) and the quality parameter are stored, e.g. locally or on a server.

It is beneficial that these steps 1100 and 1200 are—according to embodiments—repeated for a plurality of comparable situations. For example, if the same quality parameter, e.g., the same error type (cf. step 1330) is found at different subportions, the self-running algorithm can find out similarities within the analysis parameters so as to train itself for determining the respect error type. For example, if it is determined that a respective zone belonging to the same error type has the same orientation, the algorithm can be trained in that way that this orientation indicates a respective error type. Alternatively, the temperature deviation between temperature values within the spot or between the average temperature of the spot compared to the average temperature out of the spot can be taken into account. For example, the algorithm can find out that a respective error belonging to a respective error type typically occurs, when the deviation of the spot temperature to the surrounding is more than 10 degree and when the orientation has a certain angle (e.g. 90°) with respect to a travel direction. If these two analysis parameters can every time determined when the respective error is found, it can be derived by use of the method that said two analysis parameter of the plurality of analysis parameter are relevant and which respective thresholds indicate the presence of a certain situation. Since there are a plurality of possible analysis parameters and, the correlation between the single parameters or the combination of single parameters with respect to error types can be trained by use of training data. The parameters may be one or more out of the group orientation of the first zone with respect to a travel direction;

an average temperature of the temperature values within the first zone;

a relative temperature of the temperature values within the first zone when compared to the temperature values belonging to the measurement points surrounding the first zone;

a size of the first zone;

a temperature deviation within the first zone;

a shape of a pattern of the first zone;

a presence of a second zone of measurement points corresponding to a second subportion of the portion;

a further zone of measurement points corresponding to a further subportion of the portion;

a distance of the first zone to a second zone or to a further zone; and a relative position of the first zone to a second zone or a further zone.

It should be noted, that for different error types, different analysis parameters may be relevant.

To sum up, the two steps 1100 and 1200 may be repeated for different situations mapping comparable error types to analysis parameters in order to find out which analysis parameters and which value of said analysis parameters are indicative for a respective situation/error. Further, the two steps 1100 and 1200 may be repeated for different situations mapping different error types to analysis parameters in order to find out which analysis parameters are indicative for the different situation/error. These error types or, in general, the quality parameters form together with one or more analysis parameters for so-called training data enabling to train the algorithm.

According to further embodiments, it is possible to store whining the data set for the respective situation a kind of solution, like paver parameters to be varied in order to avoid the determined error.

Starting from this central process of determining an analysis parameter enabling a conclusion regarding the quality of the pavement (driving direction, orientation of a spot, temperature difference between different zones). The process can be enhanced as it follows. Generally speaking, the above-described method 1000 enables to extract from a temperature profile or another kind of image, e.g., a colored image of the pavement, analysis parameters. These are the parameters, which are uncommon or unexpected. During a diagnosis phase, a quality parameter and optionally a potential measurement can be determined. After implementing this measurement, the image of the pavement changes, e.g., becomes homogeneous. Consequently, that the respective analysis parameter would be below a respective threshold and the quality of the pavement is within the specification. This procedure can be described as follows:

determining or using an analysis parameter;

analyzing an image, e.g., a thermal record regarding the analysis parameter;

performing a diagnosis in order to determine quality issues of the pavement, i.e., determining a quality parameter;

providing a message regarding potential measurement to solve the quality issue;

Implementing the measurement;

as a result of the implementation, the respective analysis parameter is changed;

receiving a new image and analyzing the analysis parameter again.

The determination of the analysis parameter or the validation of the analysis parameter is important for the analysis performed by artificial intelligence.

Background thereof is that independent from the analysis parameter, an image can be analyzed and the diagnosis can be extracted by use of artificial intelligence image recognition algorithms which are trained accordingly. In such a case, the training data set just comprises images and respective quality parameters enabling to perform the diagnosis.

This process is called "tagging" and can be supported by a human, e.g., by selecting analysis parameters based on which the tagging should be performed. In the case that human support is missing, it can happen that the differentiation between different quality situations is misleading. For example, an AI algorithm trained for performing a differentiation between images of a husky and a wolf can be based on wrong parameters, for example, the background, since typically a husky is recorded within a winter landscape. When such a wrong parameter is determined automatically by the artificial intelligence algorithm, most of the decisions can be correct, but placed in a completely wrong parameter, since such an algorithm could not distinguish between a husky and a wolf, but more between an animal within a winter landscape or an animal within another landscape. Therefore, according to embodiments, the analysis parameters are preselected.

Regarding the proposed measurement/instructions to be output to the paving crew should be noted that, according to embodiments, it is possible, to prove the effectiveness of these measurements. For example, the same quality parameter for a respective image taken after implementing the measure, can be determined so as to prove whether the action taken was successful. According to embodiments, the information on the respective analysis parameter can be output, e.g., to a central unit which performs the training of the algorithm so as to evaluate the proposed measures. According to another embodiment, the changed parameters of the construction machine/pavement can be monitored and feedback to the training algorithm, together with the analysis parameter and optionally together with a quality parameter so as to monitor which parameters under which situation leads to which result. A so implemented system can continuously learn the determination of new problematic spots and continuously improve the effectiveness of the chosen solutions (e.g. change machine parameters).

The method 1000 may be done by neural circuit forming an artificial intelligence. Here, the plurality of determined analysis parameters for each situation (spot) are used as input parameters for the neural circuit, wherein the nodes are determined based on the correlation of respective analysis parameters relevant for a comparable quality parameter. Such a black box of a calculation unit being based on artificial intelligence is shown by FIGS. 11a and 11 b.

Figure 11A:
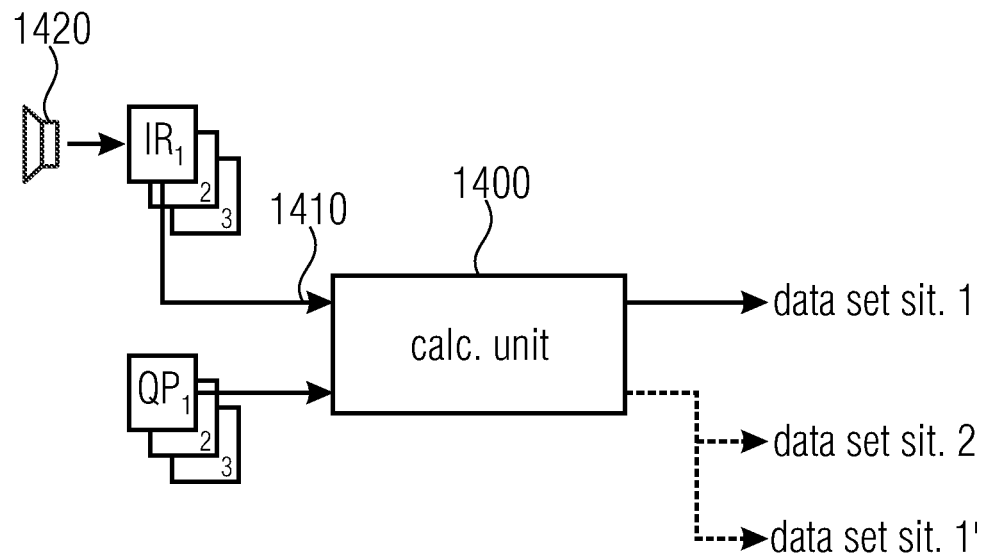
FIG. 11a shows a schematic block diagram of a calculation unit by use of which a data set can be determined according to a basic embodiment.

FIG. 11a shows a calculation unit 1400 receiving at least a first thermal profile IR, e.g., from an interface 1410 which is connected to an infrared camera 1420 (general temperature sensor). The temperature profile can be an infrared picture IR for a respective portion of the pavement comprises at least the first subportion. This first subportion is in parallel to the temperature analysis analyzed, e.g., by the operator. Based on this analysis, the quality parameter QP is generated and forwarded to the calculation unit 1400. These two parameters IR and QP are the input parameters. These input parameters $IR_1$, $IR_2$, $IR_3$, $IR_n$ and $QP_1$, $QP_2$, $QP_3$ and $QP_n$ may be received for a plurality of situations, e.g., a plurality of subportions or portions. These portions may be determined using the same paving area or different paving areas by use of the same or different pavers.

Based on at least a pair of parameters $IR_1/OQ_1$ or $IR_2/OQ_2$ or $IR_3/OQ_3$ respective data sets assigned to each other are generated. Assuming that $QP_1$ and $QP1_3$ describe comparable quality parameters, e.g., the same error type, the similarities between the analysis parameters, i.e., the similarities between $IR_1$ and $IR_3$ can be determined. Each pair $IR_1$ and $QP_1$ as well as $IR_3$ and $QP_3$ form a respective data set, e.g., the data set situation 1 and the data set situation 1'. Both data sets can be used for describing a respective error type. By having a plurality of such data sets, the relevant analysis parameters out of all analysis parameters and respective thresholds/thresholds (more than 120 degree or in the range of 115 and 130 degree) ranges can be determined. The plurality of data sets "sit 1" improve the determination efficiency and the determination accuracy of a respective situation. Of course, according to embodiments, it is possible to determine different situations, e.g., belonging to different quality parameters. Here, the data set $IR_2$ and $QP_2$ results in a data set describing a different situation, here situation 2 (data set "sit2").

It should be noted, that data set sit2 and data set sit1' are marked with hatched lines, since it just optional to analyze a plurality of pairs $ER_n$ and $OR_n$ according to basic implementation.

Figure 11B:
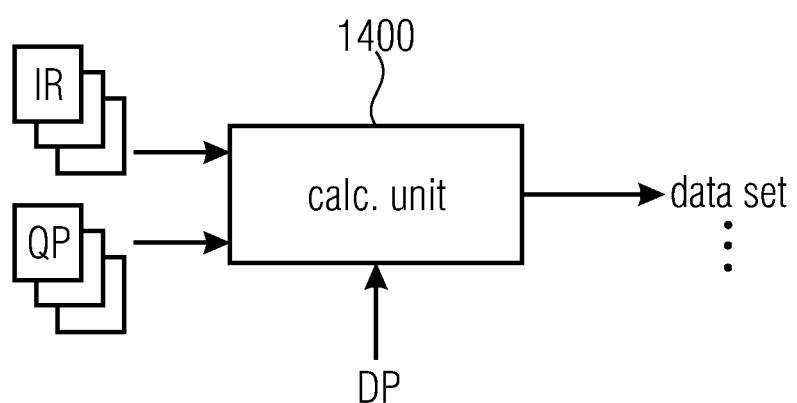
FIG. 11b shows a schematic block diagram of a calculation unit comparable to the calculation unit of FIG. 11a, but enhanced according to an enhanced embodiment.

FIG. 11b shows another configuration for the calculation unit 1400. This calculation unit receives the same input parameters IR and OP so as to determine their respective data sets. However, the calculation unit 1400 according to the embodiment of FIG. 11b is further enabled to receive a decision parameter as part of the learning data. This decision parameter can be, for example, a parameter determined by use of a different sensor. For example, this decision parameter can be dependent on operation parameters of the paver, or configuration of the paver. For example, the widths of the screen or the temperature of the paving material may have an influence. This decision parameter can be used as input parameter or can be used to adapt the nodes, e.g., the number of nodes or the analysis parameters to be combined.

According to embodiments, the determination algorithm to be determined by use of the training data has a plurality of decision layers. For example, in the first decision layer it may be determined whether a detected zone has an orientation. In the next decision, it may be determined whether the orientation is perpendicular or parallel to the travel direction. Within the next decision layer it can be determined whether the zone is a hot zone or a cold zone. By use of these decisions a situation may be clearly assigned to a quality parameter. However, other analysis parameter or another order may have the same result. The self learning algorithm enables to find out which parameter and which order lead to high determination efficiency and accuracy. Background thereof is that the order of the respective decisions may have an influence; for example, an error resulting in a segregation spot parallel to a travel direction may have temperature values in the low or medium temperature levels. The temperature from the one and to the other end along the travel direction differs due the different cooling duration along different positions within the spot along the travel direction. Thus, the determination of a longitudinal spot along the travel direction can make some analysis of absolute temperatures values, for example, obsolete. Therefor it might be beneficial to determine the orientation first, i.e. a one of the first decision layers. By use of a plurality of training data, the cross references between the respective analysis parameters can be found out. Preferably, this is done by AI approaches enabling to use the benefits of big data (large amount of training data).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for detecting a quality of a paving material distributed along a paving area using a paver, comprising:
receiving a first thermal profile of a portion of the paving area in which the paving material is distributed, the first thermal profile comprises a plurality of temperature values assigned to respective measurement points; wherein the portion comprises a first subportion;
analyzing the first thermal profile in order to detect segregated spots of the paving material within the portion enabling to determine a quality of the paving material, wherein the analyzing comprises:
determining a first zone of the measuring points arranged adjacent to each other and with temperature values within a predetermined range, wherein the first zone corresponds to the first subportion and wherein the first zone is at least partially surrounded by measurement points with temperature values out of the predetermined range;
determining a first analysis parameter for the first zone; and
determining a first quality parameter for the subportion so as to assign the first quality parameter to the first analysis parameter, wherein the first analysis parameter enables a conclusion regarding the quality of the pavement,
wherein the analyzing is based on learning data comprising at least a learning parameter and at least input data, wherein the input data comprises the first analysis parameter or a pattern as the first analysis parameter and wherein the learning parameter comprises the first quality parameter or an error type of the paving material at the first subportion as the first quality parameter;
wherein the method comprises selecting the analysis parameter or section of one or more possible analysis parameters as substep of determining the first analysis parameter and wherein the analysis parameter is selected out of a group or comprises at least one parameter out of the group comprising:
orientation of the first zone with respect to a travel direction;
an average temperature of the temperature values within the first zone;
a relative temperature of the temperature values within the first zone when compared to the temperature values belonging to the measurement points surrounding the first zone;
a size of the first zone;
a temperature deviation within the first zone;
a shape of a pattern of the first zone;
a presence of a second zone of measurement points corresponding to a second subportion of the portion;
a further zone of measurement points corresponding to a further subportion of the portion;
a distance of the first zone to a second zone or to a further zone; and
a relative position of the first zone to a second zone or a further zone; or
a combination of at least two or more group elements.

2. Method according to claim 1, wherein the method comprises storing the first analysis parameter together with the first quality parameter; and/or wherein the method comprises transmitting the first analysis parameter together with the first quality parameter so as to store the first analysis parameter and the first quality parameter on a server.

3. Method according to claim 1, wherein the analyzing comprises a self-learning algorithm and/or is based on artificial intelligence.

4. Method according to claim 1, wherein the method comprises selecting the analysis parameter or section of one or more possible analysis parameters before performing the analyzing.

5. Method according to claim 1, wherein the method further comprises receiving parameters of the paver and/or a configuration of the paver.

6. Method according to claim 1, wherein determining the first zone of the measuring points comprises a pattern determination.

7. Method according to claim 1, wherein the first quality parameter is a parameter describing an error type of the paving material at the first subportion; and/or
wherein determining the first quality parameter comprises receiving an instruction or information from an operator of the paver.

8. Method according to claim 1, wherein the analyzing is based on learning data comprising at least a decision parameter defining a type or number of decision knots, wherein the decision parameter depend on a parameter of the paver or a configuration of the paver.

9. Method according to claim 1, wherein the method further comprises receiving at least one instruction assigned to a quality parameter or an error type of the paving material at the first subportion.

10. Method according to claim 1, wherein receiving and analyzing are repeated for the same paving area or another paving area and/or wherein receiving and analyzing are repeated for another paver.

11. Method according to claim 10, wherein repeating enables to determine a plurality of comparable data sets for a comparable situation and/or repeating enables to determine a plurality of different data sets for different situation.

12. Method according to claim 1, wherein the plurality of measurement points within the thermal profile are arranged in accordance to a regular grid.

13. Method according to claim 1, wherein the method is performed for a plurality of temperature profiles, or wherein the method is performed for a plurality of temperature profiles overlapping each other.

14. Method according to claim 1, wherein the method further comprises outputting instructions to the paving crew based on the first quality parameter and/or to implement an action or to change parameters of the construction machine based on the quality parameters; and/or
wherein the method further comprises determining the first analysis parameter after outputting the instructions or after implementing the action or after changing the parameter.

15. Method according to claim 1, wherein the first quality parameter characterizes the quality of the pavement.

16. A non-transitory digital storage medium having a computer program stored thereon to perform the method for detecting a quality of a paving material distributed along a paving area using a paver, comprising:
receiving a first thermal profile of a portion of the paving area in which the paving material is distributed, the first thermal profile comprises a plurality of temperature values assigned to respective measurement points; wherein the portion comprises a first subportion;
analyzing the first thermal profile in order to detect segregated spots of the paving material within the portion enabling to determine a quality of the paving material, wherein the analyzing comprises:
determining a first zone of the measuring points arranged adjacent to each other and with temperature values within a predetermined range, wherein the first zone corresponds to the first subportion and wherein the first zone is at least partially surrounded by measurement points with temperature values out of the predetermined range;
determining a first analysis parameter for the first zone; and
determining a first quality parameter for the subportion so as to assign the first quality parameter to the first analysis parameter, wherein the first analysis parameter enables a conclusion regarding the quality of the pavement;
wherein the analyzing is based on learning data comprising at least a learning parameter and at least input data, wherein the input data comprises the first analysis parameter or a pattern as the first analysis parameter and wherein the learning parameter comprises the first quality parameter or an error type of the paving material at the first subportion as the first quality parameter;
wherein the method comprises selecting the analysis parameter or section of one or more possible analysis parameters as substep of determining the first analysis parameter and wherein the analysis parameter is selected out of a group or comprises at least one parameter out of the group comprising:
orientation of the first zone with respect to a travel direction;
an average temperature of the temperature values within the first zone;
a relative temperature of the temperature values within the first zone when compared to the temperature values belonging to the measurement points surrounding the first zone;
a size of the first zone;
a temperature deviation within the first zone;
a shape of a pattern of the first zone;
a presence of a second zone of measurement points corresponding to a second subportion of the portion;
a further zone of measurement points corresponding to a further subportion of the portion;
a distance of the first zone to a second zone or to a further zone; and
a relative position of the first zone to a second zone or a further zone; or
a combination of at least two or more group elements, when said computer program is run by a computer.

17. An apparatus for detecting the quality of a paving material distributed along a paving area, the apparatus comprising:
an interface for receiving a first thermal profile of a portion of the paving area in which the paving material is distributed, that the first thermal profile comprises a plurality of temperature values assigned to respective measurement points; wherein the portion comprises a first subportion; and
a calculation unit for analyzing the first thermal profile in order to detect segregated spots of the paving material within the portion enabling to determine a quality of the paving material, wherein the analyzing comprises:
determining a first zone of the measuring points arranged adjacent to each other and with temperature values within a predetermined range, wherein the first zone corresponds to the first subportion and wherein the first zone is at least partially surrounded by measurement points with temperature values out of the predetermined range;
determining a first analysis parameter for the first zone; and
determining a first quality parameter for the subportion so as to assign the first quality parameter to the first analysis parameter; wherein the first analysis parameter enables a conclusion regarding the quality of the pavement;
wherein the analyzing is based on learning data comprising at least a learning parameter and at least input data, wherein the input data comprises the first analysis parameter or a pattern as the first analysis parameter and wherein the learning parameter comprises the first quality parameter or an error type of the paving material at the first subportion as the first quality parameter;
wherein the analyzing comprises selecting the analysis parameter or section of one or more possible analysis parameters as substep of determining the first analysis parameter and wherein the analysis parameter is selected out of a group or comprises at least one parameter out of the group comprising:
orientation of the first zone with respect to a travel direction;
an average temperature of the temperature values within the first zone;
a relative temperature of the temperature values within the first zone when compared to the temperature values belonging to the measurement points surrounding the first zone;
a size of the first zone;
a temperature deviation within the first zone;
a shape of a pattern of the first zone;
a presence of a second zone of measurement points corresponding to a second subportion of the portion;
a further zone of measurement points corresponding to a further subportion of the portion;
a distance of the first zone to a second zone or to a further zone; and
a relative position of the first zone to a second zone or a further zone; or
a combination of at least two or more group elements.

18. The apparatus according to claim 17, wherein the calculation unit is based on artificial intelligence and/or configured to perform a self-learning algorithm.

19. The apparatus according to claim 17, wherein an apparatus comprises a thermal profile camera or an asphalt temperature scanner that is configured to record the thermal profile of the portion, when directed to the paving area.

20. The apparatus according to claim 17, wherein the apparatus comprises a mobile device and/or a display which is configured to output information and/or instructions; and/or wherein the apparatus comprises a mobile device or a control unit receiving information on the quality parameter from the operator.

21. The apparatus according to claim 17, wherein the apparatus comprises a wireless communication module, which is configured to exchange with the server a set comprising the first analysis parameter together with the first quality parameter.

22. A paver for distributing paving material comprising an apparatus according to claim 17.

\* \* \* \* \*